(12) United States Patent
Bristow

(10) Patent No.: US 10,881,100 B2
(45) Date of Patent: Jan. 5, 2021

(54) AQUEOUS SUSPOEMULSION CONTAINING LAMBDA-CYHALOTHRIN AND METHODS FOR MAKING AND USING THE SAME

(71) Applicant: ROTAM AGROCHEM INTERNATIONAL COMPANY LIMITED, Hong Kong (CN)

(72) Inventor: James Timothy Bristow, Hong Kong (CN)

(73) Assignee: ROTAM AGROCHEM INTERNATIONAL COMPANY LIMITED CHAI WAN, Hong Kong (CN)

( * ) Notice: Subject to any disclaimer, the term of this patent is extended or adjusted under 35 U.S.C. 154(b) by 170 days.

(21) Appl. No.: 14/167,740

(22) Filed: Jan. 29, 2014

(65) Prior Publication Data

US 2015/0208646 A1 Jul. 30, 2015

(51) Int. Cl.
*A01N 25/04* (2006.01)
*A01N 53/00* (2006.01)

(52) U.S. Cl.
CPC ............. *A01N 25/04* (2013.01); *A01N 53/00* (2013.01)

(58) Field of Classification Search
CPC ........ A01N 25/04; A01N 53/00; A01N 39/00; A01N 43/08; A01N 43/16; A01N 43/48; A01N 43/78; A01N 2300/00
See application file for complete search history.

(56) References Cited

U.S. PATENT DOCUMENTS

| 5,846,554 | A | * | 12/1998 | Scher | ...................... A01N 25/04 264/4.1 |
| 6,455,471 | B1 | * | 9/2002 | Gubelmann-Bonneau | ................... A01N 25/04 504/133 |
| 7,531,187 | B2 | | 5/2009 | Jadhav et al. | |
| 2002/0040065 | A1 | * | 4/2002 | Scher | ...................... A01N 25/28 516/98 |

FOREIGN PATENT DOCUMENTS

| CN | 1274530 A | 11/2000 |
| CN | 1600099 A | 3/2005 |
| CN | 1836513 A | 9/2006 |
| CN | 101167471 A | 4/2008 |
| CN | 101828571 A | 9/2010 |
| WO | 1995022902 A1 | 8/1995 |
| WO | 2002028186 A2 | 4/2002 |
| WO | 2005096820 A1 | 10/2005 |

* cited by examiner

*Primary Examiner* — Johann R Richter
*Assistant Examiner* — Danielle Sullivan
(74) *Attorney, Agent, or Firm* — Dickinson Wright PLLC

(57) ABSTRACT

An aqueous suspoemulsion, characterized in that it contains at least the two components:
  (a) a dispersed oil phase comprising:
    (i) lambda-cyhalothrin as the first active ingredient, and
    (ii) at least one $C_9$-$C_{10}$ aromatic hydrocarbon solvent having lambda-cyhalothrin dissolved therein;
  (b) a continuous water phase containing:
    (i) at least one water-insoluble second active ingredient which is suspended in the continuous phase; and
    (ii) a dispersing agent in an amount sufficient to disperse the water-insoluble active ingredient.
Methods of making and using this suspoemulsion are also disclosed.

16 Claims, No Drawings

AQUEOUS SUSPOEMULSION CONTAINING LAMBDA-CYHALOTHRIN AND METHODS FOR MAKING AND USING THE SAME

BACKGROUND

1. Field

Disclosed herein is a suspoemulsion formulation comprising lambda-cyhalothrin as emulsified component.

2. Description of Related Art

Lambda-cyhalothrin is the ISO approved common name of the insecticidal active ingredient consisting of the enantiomeric pair of isomers S-alpha-cyano-3-phenoxybenzyl-1R,cis-3-(Z-2-chloro-3,3,3-trifluroprop-1-en-1-yl)-2,2-dimehtylcyclopropane carboxylate and R-alpha-cyano-3-phenoxybenzyl-1S,cis-3-(Z-2-chloro-3,3,3-trifluoroprop-1-en-1-yl)-2,2-dimethylcyclopropane carboxylate in racemic proportions.

When lambda-cyhalothrin is used as a single active herbicide in a formulation, the traditional formulation is as an emulsion concentrate (EC). Products comprising lambda-cyhalothrin intended for use in agriculture or horticulture are usually sold under the name KARATE®.

Some environmentally-friendly formulations have also been developed. CN 101828571 describes a lambda-cyhalothrin suspension concentrate. CN 101167471 describes lambda-cyhalothrin water dispersible granules. CN 1600099 describes a lambda-cyhalothrin wettable powder. However, in these formulations, the lambda-cyhalothrin active ingredient tends to come out of the formulation during fine grinding and milling because of its low melting point. The resulting compositions do not generally exhibit good dispersibility and shelf life. This is believed to be due, at least in part, to the low melting point of the active compound, which undergoes a phase change over a wide range of ambient storage temperatures (−5 to 50° C.). This can lead to caking and crystal growth. Formulation as microcapsules can reduce or eliminate the problems caused by the low melting point of lambda-cyhalothrin. However, such a formulation is expensive and requires a complex production process.

In recent years there has been an increasing desire and need to increase the efficacy, broaden the spectrum of applicability, and delay the development of resistance to pesticides, including insecticides, by combining the application of two or more products.

U.S. Pat. No. 7,531,187 relates to a synergistic insecticidal composition containing a chloronicotynyle compound and a pyrethroid compound. The chloronicotynyle compound is disclosed to be preferably imidacloprid. The pyrethroid compound is disclosed to be preferably cypermethrin. The synergistic insecticidal composition containing the chloronicotynyle compound and the pyrethroid compound can be provided as customary formulations, such as solutions, emulsions, suspensions, powders, foams, pastes, granules, aerosols, active-compound-impregnated natural and synthetic materials, very fine encapsulations in polymeric substances, or in coating compositions for seed. The preferred formulations are disclosed to be an emulsifiable concentrate (EC), wettable powder (WP) or dry flowable granular compositions (DF). The examples describe an imidacloprid and cypermethrin WP, an imidacloprid and permethrin WP, an imidacloprid and cypermethrin DF, an imidacloprid and permethrin DF, an imidacloprid and cypermethrin EC, and an imidacloprid and permethrin EC.

CN 1836513, WO 2005096820, WO 2002028186, CN 1274530 and WO 9522902 disclose compositions comprising solid actives, such as fipronil or imidacloprid, and liquid actives, such as lambda-cyhalothrin or chlorpyrifos, wherein the compositions are formulated as an oil emulsion, ultra-low content spray, oil-in-water emulsion, microemulsion, wettable powder, water dispersible granule, dry suspension, granule, water solution, wettable powder, aerosol, suspension concentrates, and emulsifiable concentrates. While these publications generally disclose various formulations of a combination of pesticidal actives, including a water dispersible granule, suspension concentrate or wettable powder, they do not provide or teach a method of preparing the water dispersible granule composition, suspension concentrate composition or wettable powder composition. Commercial products based on the above combinations are not readily available in a water dispersible granule composition, suspension concentrate composition or wettable powder composition. As pointed out above, standard process for preparing a water dispersible granule, suspension concentrate or wettable powder for a combination of the pesticidal actives including lambda-cyhalothrin, may not be feasible and would not provide a satisfactory composition, as such compositions do not possess good dispersion, stability, shelf life and other properties that a water dispersible granule, suspension concentrate or wettable powder should have.

In general, formulations of active compounds for crop protection should have high chemical and physical stability, and should be environmentally friendly, easy to apply and to use, and should have broad biological action, especially when combined with further active compounds.

SUMMARY

A suspoemulsion (SE) is a combination of an emulsion concentrate (EC) of one component with a suspension concentrate (SC) of another component. An EC phase is one in which the first active ingredient is dissolved in oil. An SC phase is a suspension of another active ingredient in water. When the two phases are mixed, water used as the continuous phase in the emulsion concentrate, carrying oil droplets used as the dispersed phase containing one active ingredient, is intermingled with suspended particles of another active ingredient. Generally, the SC, and hence the resulting SE, additionally contains other components such as a dispersant to aid the stability of the suspension and hence of the whole system.

Because lambda-cyhalothrin is a low melting point compound, conventional wisdom suggests developing a combination that includes lambda-cyhalothrin in a suspoemulsion wherein lambda-cyhalothrin is an emulsified component in the whole system, and the other active ingredient is suspended in the continuous phase.

However, it has been found that lambda-cyhalothrin is not storage stable and is easy to decompose in a suspoemulsion wherein lambda-cyhalothrin is an emulsified component during storage, especially during heat storage at temperatures at around 54° C.

As a result, there has been an ongoing need to develop stable formulations for the suspoemulsion of lambda-cyhalothrin as the emulsified component. The inventor found that the solvents in the dispersed oil phase have an important effect on lambda-cyhalothrin stability. Certain solvents not only solubilize lambda-cyhalothrin (and do not, or only sparingly solubilize the second active ingredient suspended in the continuous phase), but also stabilize lambda-cyhalothrin which is present as an emulsified component in the suspoemulsion formulation during storage, especially during heat storage at 54° C.

The compositions and methods disclosed herein thus provide an important tool in solving the lambda-cyhalothrin stability problem in a suspoemulsion wherein lambda-cyhalothrin is an emulsified component, during storage, especially during heat storage at temperatures as high as 54° C.

Disclosed herein is a stable and environmentally-friendly aqueous suspoemulsion (SE) comprising lambda-cyhalothrin as an emulsified component.

In particular, in one embodiment, the disclosure herein relates to the use of certain $C_9$-$C_{10}$ aromatic hydrocarbons as the solvent to stabilize lambda-cyhalothrin in the suspoemulsion comprising lambda-cyhalothrin as an emulsified component. The certain $C_9$-$C_{10}$ aromatic hydrocarbon solvent dissolves lambda-cyhalothrin while the other active ingredient is insoluble in the $C_9$-$C_{10}$ aromatic hydrocarbon solvent and thus remains suspended in the continuous phase. Desirably, the $C_9$-$C_{10}$ aromatic hydrocarbon solvent advantageously stabilized lambda-cyhalothrin in the suspoemulsion formulation during storage, especially during heat storage at 54° C.

Accordingly, in a first aspect, the invention disclosed herein provides an aqueous suspoemulsion, characterized in that it comprises the components:
(a) a dispersed oil phase comprising:
  (i) lambda-cyhalothrin as a first active ingredient,
  (ii) at least one $C_9$-$C_{10}$ aromatic hydrocarbon solvent having the lambda-cyhalothrin dissolved therein;
(b) a continuous water phase comprising:
  (i) at least one second active ingredient, which is insoluble or sparingly soluble in water and in the at least one $C_9$-$C_{10}$ aromatic hydrocarbon solvent, suspended in the continuous phase;
  (ii) a dispersing agent in an amount sufficient to disperse the water-insoluble active ingredient; and
  (iii) water.

The dispersed oil phase, component (a), may further comprise one or more additional solvents or other additives.

The continuous water phase, component (b), may further comprise one or more additional dispersants or other additives.

In a further aspect, the invention disclosed herein provides a process for preparing an aqueous suspoemulsion as hereinbefore described, characterized in that it comprises the steps:
preparing a lambda-cyhalothrin emulsified concentrate (EC) phase by mixing the lambda-cyhalothrin with at least one $C_9$-$C_{10}$ aromatic hydrocarbon solvent;
preparing a suspension concentrate (SC) phase comprising a dispersion of particles of the second active ingredient, which is insoluble or sparingly soluble in water and in the at least one $C_9$-$C_{10}$ aromatic hydrocarbon solvent in a continuous aqueous phase by mixing the second active ingredient, one or more dispersants and/or other additives, and a required amount of water; and
combining the lambda-cyhalothrin EC phase with the SC phase to produce a suspoemulsion wherein the EC phase is emulsified in the SC phase. The steps of preparing the lambda-cyhalothrin EC phase and of preparing the SC phase can be carried out in any order.

An alternative embodiment of the process comprises the steps:
preparing the lambda-cyhalothrin EC phase by mixing lambda cyhalothrin with at least one a $C_9$-$C_{10}$ aromatic hydrocarbon solvent;
adding the lambda-cyhalothrin EC phase to water or an aqueous solution with high shear, resulting in a lambda-cyhalothrin oil-in-water emulsion (EW) phase;
preparing a dispersion of particles of a second active ingredient in a continuous water phase by mixing the active ingredient, one or more dispersants and/or other additives, and a required amount of water; and
combining the oil-in-water emulsion phase with the dispersion of particles of the second active ingredient.

In another embodiment is disclosed a process for preparing the suspoemulsion, comprising:
preparing an emulsified concentrate (EC) phase comprising lambda-cyhalothrin by mixing lambda-cyhalothrin with at least one $C_9$-$C_{10}$ aromatic hydrocarbon solvent along with one or more suitable emulsifiers;
preparing a suspension concentrate (SC) phase comprising a dispersion of particles of a second active ingredient, which is insoluble or sparingly soluble in water and in the at least one $C_9$-$C_{10}$ aromatic hydrocarbon solvent in a continuous aqueous phase by mixing the second active ingredient, one or more dispersants and/or other additives, and a required amount of water;
adding the EC phase to the SC phase under continuous agitation for optimum period of time;
preparing one or more thickeners by hydrating them with water or other aqueous solution; and
mixing a quantity of the thickener the mixture of the EC phase and the SC phase under continuous agitation until the result is a homogeneous suspension.

Other embodiments provide a method of stabilizing a suspoemulsion containing lambda-cyhalothrin as an emulsified component, comprising emulsifying the lambda-cyhalothrin in a $C_9$-$C_{10}$ aromatic hydrocarbon solvent, and methods for using the suspoemulsion described above, and in particular, a method of treating pests at a locus comprising applying the suspoemulsion to the locus.

DETAILED DESCRIPTION OF SPECIFIC EMBODIMENTS

As indicated above, lambda-cyhalothrin is a low melting point compound, so that conventional wisdom in the art would suggest developing formulations with lambda-cyhalothrin as a suspoemulsion wherein lambda-cyhalothrin is an emulsified component present throughout the formulation, and the other active ingredient is suspended in the continuous phase.

However, as explained above, the inventor found that in suspoemulsion formulations with lambda-cyhalothrin as the emulsified component, lambda-cyhalothrin is not stable, and tends to decompose in the suspoemulsion formulation during storage, especially during heat storage at 54° C.

In embodiments of the invention disclosed herein, it has been surprisingly found that certain $C_9$-$C_{10}$ aromatic hydrocarbon solvents, when used as solvents in a lambda-cyhalothrin EC phase, not only solubilize the lambda-cyhalothrin and fail to solubilize, or only sparingly solubilize the second active ingredient, which is suspended in the continuous phase, but also that these solvents stabilize the lambda-cyhalothrin active ingredient in the suspoemulsion formulation during storage, especially during heat storage at 54° C.

As indicated above, it has been found that certain $C_9$-$C_{10}$ aromatic hydrocarbon solvents are surprisingly effective in stabilizing lambda-cyhalothrin as an emulsified component in a suspoemulsion formulation containing another active ingredient, desirably another pesticide, such as herbicides, fungicides, insecticides, or other pesticides, or a combination of any of these. Thus, the inclusion of one or more $C_9$-$C_{10}$ aromatic hydrocarbon solvent has been found to reduce or prevent lambda-cyhalothrin decomposition, particularly during storage, and particularly during heat storage.

The $C_9$-$C_{10}$ aromatic hydrocarbon solvents are suitable for preparing a lambda-cyhalothrin EC phase in a suspoemulsion formulation wherein lambda-cyhalothrin is an emulsified component; in particular, $C_9$-$C_{10}$ aromatic hydrocarbon solvents are active in stabilizing lambda-cyhalothrin in the suspoemulsion formulation during storage, especially during heat storage at 54° C.

In a first aspect, embodiments of the invention disclosed herein provide an aqueous suspoemulsion, characterized in that it comprises the components:
(a) dispersed oil phase comprising:
  (i) lambda-cyhalothrin as the first active ingredient,
  (ii) at least one C9-C10 aromatic hydrocarbon solvent having lambda-cyhalothrin dissolved therein;
(b) a continuous water phase comprising:
  (i) at least one water-insoluble second active ingredient which is suspended in the continuous phase;
  (ii) a dispersing agent in an amount sufficient to disperse the water-insoluble active ingredient.

In a further aspect, certain embodiments of the invention disclosed herein provide a process for preparing an aqueous suspoemulsion as hereinbefore described, characterized in that it comprises the steps:
  preparing the lambda-cyhalothrin EC phase by mixing the lambda-cyhalothrin active ingredient with at least one a $C_9$-$C_{10}$ aromatic hydrocarbon solvent;
  preparing a dispersion of particles of a second active ingredient in a continuous water phase by mixing the second active ingredient, a dispersant, and a required amount of water; and combining the EC phase with the dispersion phase.

Alternatively, another embodiment for producing an aqueous suspoemulsion as described herein comprises the steps:
  preparing the lambda-cyhalothrin EC phase by mixing the lambda-cyhalothrin active ingredient with at least one $C_9$-$C_{10}$ aromatic hydrocarbon solvent;
  adding the lambda-cyhalothrin EC phase into water with high shear, and to produce a lambda-cyhalothrin EW phase preparing an aqueous dispersion of particles of the second active ingredient in a continuous water phase by mixing the active ingredient, a dispersant, and a required amount of water; and
  combining the EW phase with the aqueous dispersion phase produced in Step 3.

The details of the individual steps involve preparing EC, EW, and SC phases in a known manner using techniques known to the one skilled in the art.

In the formulations of embodiments of the invention disclosed herein, the at least one $C_9$-$C_{10}$ aromatic hydrocarbon solvent is present in an amount sufficient to reduce or prevent lambda-cyhalothrin from decomposing. The amount of the $C_9$-$C_{10}$ aromatic hydrocarbon solvent or solvents present in the suspoemulsion will depend, in part, on the concentrate of lambda-cyhalothrin and may be determined without undue experiments.

However, the $C_9$-$C_{10}$ aromatic hydrocarbon solvent or solvents is preferably present in an amount such as to give a weight ratio of lambda-cyhalothrin to $C_9$-$C_{10}$ aromatic hydrocarbon of from 1:10 to 10:1, more preferably from 1:5 to 5:1, still more preferably from 1:2 to 2:1.

The suspoemulsion may comprise a single $C_9$-$C_{10}$ aromatic hydrocarbon solvent or a combination of two or more $C_9$-$C_{10}$ aromatic hydrocarbon solvents. Moreover, the term $C_9$-$C_{10}$ aromatic hydrocarbon solvent is intended to encompass solvents that are or include a $C_9$ aromatic hydrocarbon solvent, solvents that are or include a $C_{10}$ aromatic hydrocarbon solvent, and solvents that are or include both a $C_9$ aromatic hydrocarbon solvent and a $C_{10}$ aromatic hydrocarbon solvent.

The suspoemulsion composition of the embodiments disclosed herein is usable as a liquid concentrate. The one or more $C_9$-$C_{10}$ aromatic hydrocarbon is preferably present in an amount of at least 2% by weight, more preferably at least 5% by weight, based upon the weight of the suspoemulsion.

The $C_9$-$C_{10}$ aromatic hydrocarbon desirably includes those that are commercially available. One example of a suitable commercially available $C_9$ aromatic hydrocarbon solvent is a light aromatic naphtha solvent having an aromatic content greater than 99 wt %, and including such a solvent having a distillation range (initial boiling point) of around 327° F., a distillation range (dry point) of around 356° F., and a flash point of around 122° F. Examples of such a solvent is sold under the trademark SOLVESSO™ 100 (Exxon) and under the tradename GaroSOL 100 (Ganga Rasayanie).

An example of a suitable commercially available $C_{10}$ aromatic hydrocarbon solvent is a heavy aromatic naphtha solvent, having an aromatic content greater than 99 wt %, and including such a solvent having a distillation range (initial boiling point) of around 358° F., a distillation range (dry point) of around 405° F., and a flash point of around 151° F., sold under the trademark SOLVESSO™ 150 (Exxon), and under the tradename GaroSOL 150 (Ganga Rasayanie).

In addition to lambda-cyhalothrin, the suspoemulsion formulation of the present invention may include one or more water-insoluble active ingredients as the second active ingredient suspended in the continuous water phase. The one or more additional active ingredients may desirably include a pesticide, for example a herbicide, fungicide, insecticide or the like. Examples of suitable water-insoluble active ingredients for use in the present invention include Imidacloprid, Thiamethoxam, dinotefuran, Emamectin benzoate, Abamectin, Flufenoxuron, Lufenuron, Chlorfenapyr, Diafenthiuron, Pirimiphos-methyl, Phenthoate, Fluacrypyrim, Chlorpyrifos, Tebufenpyra, Spirodiclofen, Tolfenpyrad, Spinosad, Methoxyfenozide, Thifluzamide, Tebuconazole, Sulfoxaflor, Fipronil, Profenofos, Pymetrozine, Phoxim, Spiromesifen, Chlorfluazuron, and mixtures thereof.

Certain embodiments of the suspoemulsion disclosed herein may comprise one or more additional solvents in component (a). Examples of suitable additional solvents include N-methyl pyrrolidone, methyl oleate, propylene carbonate, N-octyl pyrrolidone, cyclohexyl-1-pyrrolidone; a mixture of paraffinic, isoparaffinic, and cycloparaffinic hydrocarbons, and mixtures thereof. Desirably, such suitable solvents are commercially available.

Certain embodiments of the suspoemulsion disclosed herein may comprise one or more emulsifiers in component (a). Examples of suitable emulsifiers for inclusion in the suspoemulsion are also known in the art and commercially available. Suitable emulsifiers include both ionic and non-ionic emulsifiers, such as fatty acid esters, fatty alcohol esters, ethers, alkyl sulphonates and aryl sulphonates. Other suitable surface active emulsifiers will also be known to the person skilled in the art.

Certain embodiments of the suspoemulsion disclosed herein may comprise one or more suitable dispersants in component (b). Desirably, the compositions described herein can comprise a mixture of two different dispersants. Examples of preferred dispersants are mentioned below:

Methacrylic acid-methyl methacrylate-polyethylene glycol graft copolymer, for example those commercially available under the name Atlox™ 4913 (from Uniqema) and TERSPERSE® 2500 (Huntsman Surfactant);

Tristyrylphenolethoxylates having an average of 16 to 60, preferably 16 to 50, oxyethylene units; sulfated or phosphated tristylphenolethoxylates having an average of 6 to 20, preferably 7 to 16, oxyethylene units, and also salts of these substances; wherein specific mention may be made of commercial products known under the names SOPROPHOR®FLK (from Rhodia), SOPROPHOR®3 D33 (from Rhodia), and SOPROPHOR®S/40-P (from Rhodia); and Propylene oxide/ethylene oxide block copolymers having at least 40 mol % polyoxyethylene units, a central polyoxypropylene portion, preferably having a molecular mass of from 1500 to 2000. The products commercially available under the names PLURONIC®PE10100 (from BASF), PLURONIC®PE10500 (from BASF) and PLURONIC®6800 (From BASF) may be mentioned by way of example. The surfactants mentioned above are believed to impart the stability to the system.

In addition to the aforementioned components, the suspoemulsion may comprise one or more further additives, as may be required. Additives for inclusion in the formulation are known in the art and commonly employed in pesticidal formulations, in particular, in herbicidal or insecticidal formulations, more particularly, in emulsions, suspensions, or suspoemulsions. Suitable additives which may be included in the suspoemulsion are all customary formulation adjuvants, such as anti-foaming agents, emulsifiers, antifreeze agents, preservatives, antioxidants, colorants, thickeners, inert fillers, and combinations of these.

Suitable anti-foaming agents include all substances which can normally be used for this purpose in agrochemical compositions. Examples of particularly preferred anti-foaming agents include mixtures of polydimethylsiloxanes and perfluroalkylphosphonic acids, such as the silicone anti-foaming agents available from GE or Compton.

Suitable preservatives include all substances which can normally be used for this purpose in agrochemical compositions of this type. Suitable examples which may be mentioned include PREVENTOL® (from Bayer AG) and PROXEL® (from Bayer AG).

Suitable antioxidants are all substances which can normally be used for this purpose in agrochemical compositions. An example of a particular antioxidant is butylated hydroxytoluene.

Suitable inert fillers include all substances which can normally be used for this purpose in agrochemical compositions and which do not act as thickeners. Examples of suitable inert fillers include inorganic particles, such as carbonates, silicates and oxides, and also organic substances, such as urea/formaldehyde condensates. By way of more particular example, kaolin, rutile, silica, finely divided silica, silica gels, and natural and synthetic silicates, and also talc may be mentioned. Mixtures of inorganic and organic fillers, and of different specific fillers within each class may be used.

Suitable thickeners include all substances which can normally be used for this purpose in agrochemical compositions. For example, xanthan gum, PVOH, cellulose, clay hydrated silicates, magnesium aluminum silicates or a mixture thereof. Again, such thickeners are known in the art and available commercially. Mixtures of different thickeners can be used.

In addition, the suspoemulsion also comprises water, present in the aqueous component (b).

The content of the individual components in the suspoemulsion can be varied within a relatively wide range. Thus, the concentrations of the components as may be present are typically as follows:

of the active compounds from the group (i) of (a) are generally between 1% and 40% by weight of the suspoemulsion, preferably between 5% and 30% by weight of the suspoemulsion;

of the active compounds from the group (i) of (b) are generally between 1% and 60% by weight of the suspoemulsion, preferably between 10% and 30% by weight of the suspoemulsion;

of the solvent from the group (ii) of (a) are generally between 2% and 40% by weight of the suspoemulsion, preferably between 5% and 25% by weight of the suspoemulsion;

of the dispersants from the group (ii) of (b) are generally between 1% and 10% by weight of the suspoemulsion, preferably between 1% and 6% by weight of the suspoemulsion;

of water, generally between 5% and 95% by weight of the suspoemulsion, preferably between 10% and 85% by weight of the suspoemulsion.

The suspoemulsions may be prepared using any suitable method. The preferred formulations are preferably prepared by the following procedure:

Step 1: Preparing the lambda-cyhalothrin EC phase by mixing the active ingredient(s) with a solvent, along with suitable emulsifiers;

Step 2: Preparing a dispersion of particles of the second active ingredient(s) in a continuous water phase by mixing the active ingredient(s), a dispersant and a required amount of water;

The water-insoluble active ingredient along with suitable dispersants and other additives, such as antifreezing agent and antifoaming agent, and a required amount of water are initially mixed well and finely milled using a horizontal agitating bead mill maintaining the process parameters like the average particle size d50 not to exceed 5 microns and for almost all the particles d90 not to exceed 6 microns.

Step 3: The EC phase produced in step 1 is added to the water phase produced in step 2 under continuous agitation for an optimum amount of time.

Step 4: The thickeners, like polysaccharides or Xanthan gums, are prepared in advance to enable them to be hydrated and be ready for the addition in the following step as mentioned as Step 5.

Step 5: Adding a suitable quantity of thickener, such as a gum prepared in step 4, to the mixture in step 3 and continuously agitating until the mixture is a homogeneous suspension.

The preferred formulations may also be prepared by the following procedure:

Step 1: Preparing the lambda-cyhalothrin EC phase by mixing the active ingredient with a solvent, along with suitable emulsifiers;

Step 2: Adding the lambda-cyhalothrin EC phase in Step 1 into water with high shear, resulting in a lambda-cyhalothrin EW phase Step 3: Preparing a dispersion of particles of the second active ingredient in a continuous water phase by mixing the active ingredient, a dispersant and a required amount of water;

The second active ingredient along with suitable dispersants and other additives such as an antifreezing agent and an antifoaming agent, and a required amount of water, are initially mixed well and finely milled using a horizontal agitating bead mill maintaining the process parameters like the average particle size d50 not to exceed 5 microns and for almost all the particles d90 not to exceed 6 microns.

Step 4: Adding the oil in water emulsion produced in step 2 to the water phase produced in step 3 under continuous agitation for an optimum amount of time.

Step 5: The thickeners, like polysaccharides or Xanthan gums, are prepared in advance to enable them to be hydrated and be ready for the addition in the following step as mentioned as Step 6.

Step 6: Adding suitable quantity of the thickener such as a gum in step 5 to the mixture in step 4 and continuously agitating until the mixture is a homogeneous suspension.

The suspoemulsion is tested for elevated temperature storage stability at 54° C. for 14 days. These suspoemulsions exhibited improved lambda-cyhalothrin stability during storage, especially during heat storage at 54° C.

The application rate of the suspoemulsion described herein can be varied within a relatively wide range. The application rate depends on the amounts of the active ingredients in the suspoemulsion and intended purpose, which can be determined by a skilled person in this field.

In a further aspect, disclosed herein is a method for controlling pests at a locus, in particular for controlling insects, the method comprising applying to the locus an effective amount of a composition comprising or prepared by diluting a suspoemulsion as hereinbefore described.

Still further, also described herein is the use of a concentrate formulation as hereinbefore described in the control of pests at a locus.

While certain aspects and embodiments of the invention will now be described in connection with certain preferred embodiments in the following examples, it will be understood that it is not intended to limit the invention to these particular embodiments. On the contrary, it is intended to provide an exemplary disclosure relevant to all alternatives, modifications and equivalents as may be included within the scope of the invention as defined by the appended claims. Thus, the following examples, which include preferred embodiments, will serve to illustrate the practice of this invention, it being understood that the particulars shown are by way of example and for purposes of illustrative discussion of preferred embodiments of the present invention only and are presented in the cause of providing what is believed to be a useful and readily understood description of procedures as well as of the principles and conceptual aspects of the invention.

PREPARATION EXAMPLES

Example 1

A suspoemulsion formulation was prepared as follows:
a) Emulsion Concentrate Preparation of Lambda-Cyhalothrin Phase:

An emulsion concentrate was prepared using the components and amounts given below. The active ingredient lambda-cyhalothrin (technical grade obtained from Jiangsu Youshi Chemistry) was mixed with SOLVESSO™ 100 (Exxon) at room temperature. The mixture was allowed to stand for 30 minutes before the addition of the emulsifier EL360 (Clariant) under stirring until a homogeneous solution was achieved. The amounts of each component used are provided in the table below.

| Content | Weight (g) | Remark |
| --- | --- | --- |
| Lambda-cyhalothrin Tech (Jiangsu Youshi) | 5 (as pure) | active ingredient |
| SOLVESSO ™100 (Exxon) | 25 | solvent |
| EL360 (Clariant) | 3 | emulsifier | b) Preparation of Dispersed Particles of Imidacloprid (Jiangsu Yangnong) Active Ingredient in a Continuous Water Phase:

| Content | Weight (g) | Remark |
| --- | --- | --- |
| Imidacloprid Tech (Jiangsu Yangnong) | 5 (as pure) | active ingredient |
| SOPROPHOR ®BSU (Rhodia) | 0.5 | dispersant |
| SOPROPHOR ®FLK (Rhodia) | 1.5 | dispersant |
| Propylene glycol (DOW) | 4 | antifreezing agent |
| RHODOPOL ®23/W (Rhodia) | 0.15 | thickener |
| Silicon oil (Degussa) | 0.5 | defoamer |
| water | 55.35 | carrier |

An aqueous dispersion was prepared using the components and amounts given above. The active ingredient Imidacloprid, along with suitable dispersants SOPROPHOR®BSU and SOPROPHOR®FLK and other additives such as an antifreezing agent and antifoaming agent and required amount of water were initially mixed well and finely milled using a horizontal agitating bead mill maintaining the process parameters, such as the average particle size d50 not to exceed 5 microns and for almost all the particles d90 not to exceed 6 microns.

c) Preparation of the Suspoemulsion

The oil phase (a) was added to water phase (b) under a continuous agitation for half an hour at room temperature. Then, a thickener gum (RHODOPOL®23/W) was added to the above mixture and continuously agitated until the mixture was a homogeneous suspension at room temperature. The suspoemulsion was tested for elevated temperature storage stability at 54° C. for 14 days, as explained in more detail below.

Comparative Example A

Comparative Example A was prepared using the same procedure as described above for Example 1, and using the same components and amounts are all same as used in Example 1, except that methyl oleate (Clariant) was used in place of SOLVESSO™ 100 in step a).

Example 2

A suspoemulsion formulation was prepared as follows, using the components and amounts given below:
a) Oil-in-Water Emulsion Preparation of Lambda-Cyhalothrin EW Phase

| Content | Weight (g) | Remark |
| --- | --- | --- |
| Lambda-cyhalothrin Tech | 8 (as pure) | active ingredient |

-continued

| Content | Weight (g) | Remark |
|---|---|---|
| SOLVESSO™100 (Exxon) | 4 | solvent |
| Atlox™4912 (Croda) | 2 | emulsifier |
| TWEEN®80 (Croda) | 0.3 | emulsifier |

The active ingredient lambda-cyhalothrin was mixed with SOLVESSO™ 100 at room temperature. It was allowed to stand for 30 minutes before the addition of the emulsifier EL360 and then stirred until a homogeneous solution was obtained. The resulting lambda-cyhalothrin EC phase was then added into water with high shear to obtain the lambda-cyhalothrin EW phase.

b) Preparation of Dispersed Particles of Lufenuron in a Continuous Water phase:

| Content | Weight (g) | Remark |
|---|---|---|
| Lufenuron Tech (Shanghai Shitou) | 10 (as pure) | active ingredient |
| TERSPERSE®2500 (Huntsman) | 0.4 | dispersant |
| PLURONIC®6800 (BASF) | 1.2 | dispersant |
| Propylene glycol | 4 | antifreezing agent |
| RHODOPOL®23/W (Rhodia) | 0.15 | thickener |
| Silicon oil (Degussa) | 0.5 | defoamer |
| water | 69.45 | carrier |

The preparation of the suspension concentrate of Lufenuron was carried out using the same general method as set out in b) of Example 1 using the components and amounts given above.

c) Suspoemulsion

The oil-in-water EW phase obtained in step (a) was added to the aqueous SC phase obtained in step (b) under a continuous agitation for half an hour. Then, the thickener gum was added to the resulting mixture and continuously agitated until the mixture was a homogeneous suspension. The suspoemulsion was tested for elevated temperature storage stability at 54° C. for 14 days, as explained in more detail below.

Comparative Example B

The comparative example B was prepared using the same procedures as described above in connection with Example 2. The components and amounts are all same as used in Example 2, except that ISOPAR™ L (EXXON) replaced SOLVESSO™ 100 in a) of Example 2.

Example 3

A suspoemulsion formulation was prepared as follows:
a) Emulsion Concentrate Preparation of Lambda-Cyhalothrin Phase

| Content | Weight (g) | Remark |
|---|---|---|
| Lambda-cyhalothrin Tech | 10 (as pure) | active ingredient |
| SOLVESSO™150 (Exxon) | 20 | solvent |
| ALKAMULS®OR/36 (Rhodia) | 3 | emulsifier |

The emulsion concentrate of lambda-cyhalothrin was prepared in the same general manner as set out in step a) of Example 1 using the components and amounts indicated above.

b) Preparation of Dispersed Particles of Thiamethoxam in a Continuous Water Phase

| Component | Weight (g) | Remark |
|---|---|---|
| Thiamethoxam Tech (Hengyuan Shenwu) | 10 (as pure) | active ingredient |
| SOPROPHOR®3D33 (Rhodia) | 2.3 | dispersant |
| PLURONIC®10100 (BASF) | 2.3 | dispersant |
| Propylene glycol (DOW) | 4 | antifreezing agent |
| RHODOPOL®23/W (Rhodia) | 0.15 | thickener |
| Silicon oil | 0.5 | defoamer |
| water | 47.75 | carrier |

The preparation of the suspension concentrate of Thiamethoxam was carried out using the same general method as set out in b) of Example 1, and the components and amounts given above.

c) Suspoemulsion

The suspoemulsion was prepared using the same general procedure set out in c) of Example 1, and using the emulsion and suspension set forth above. The suspoemulsion was tested for elevated temperature storage stability at 54° C. for 14 days as explained in more detail below.

Comparative Example C

The composition of Comparative Example C was prepared using the same procedure as used in Example 3. The components and amounts are all same as used in Example 3 except that ISOPAR™ M (EXXON) replaced SOLVESSO™ 150 in a) of Example 3.

Example 4

A suspoemulsion formulation was prepared as follows:
a) Emulsion Concentrate Preparation of Lambda-Cyhalothrin EC Phase

| Content | Weight (g) | Remark |
|---|---|---|
| Lambda-cyhalothrin Tech | 15 (as pure) | active ingredient |
| SOLVESSO™100 (Exxon) | 3 | solvent |
| ALKAMULS®OR/36 (Rhodia) | 3 | emulsifier |

The emulsion concentrate of lambda-cyhalothrin was prepared in the same general manner as set out in a) of Example 1, using the components and amounts set forth above.

b) Preparation of Dispersed Particles of Abamectin in a Continuous Water phase:

| Content | Weight (g) | Remark |
|---|---|---|
| Abamectin (Hebei Weiyuan) | 1.0 (as pure) | active ingredient |
| TERSPERSE ®2500 (Huntsman) | 2.5 | dispersant |
| SOPROPHOR ®FLK (Rhodia) | 1 | dispersant |
| Propylene glycol | 4 | antifreezing agent |
| RHODOPOL ®23/W (Rhodia) | 0.15 | thickener |
| Silicon oil (Degussa) | 0.5 | defoamer |
| Water | 69.85 | carrier |

The preparation of the suspension concentrate of Abamectin was carried out using the same general method as set out in b) of Example 1, and using the components and amounts set forth above.

c) Suspoemulsion

The suspoemulsion was prepared using the same general procedure set out in c) of Example 1 and using the emulsion and suspension set forth above. The suspoemulsion was tested for elevated temperature storage stability at 54° C. for 14 days.

Comparative Example D

The composition of Comparative Example D was prepared using the same procedure as was used with Example 4. The components and amounts are all same as used in Example 4, except that propylene carbonate (Local) replaced SOLVESSO™ 100 in a) of Example 4.

Example 5

A suspoemulsion formulation was prepared as follows:
a) Oil in Water Emulsion Preparation of Lambda-Cyhalothrin EW Phase

| Content | Weight (g) | Remark |
|---|---|---|
| Lambda-cyhalothrin Tech | 20 (as pure) | active ingredient |
| SOLVESSO™150 (Exxon) | 2 | solvent |
| ALKAMULS ®OR/36 (Rhodia) | 3 | emulsifier |

The oil in water emulsion of lambda-cyhalothrin EW phase was prepared in the same general manner as set out in a) of Example 2, but using the components and amounts set forth above.

b) Preparation of Dispersed Particles of the Emamectin Benzoate in a continuous water phase:

| Content | Weight (g) | Remark |
|---|---|---|
| Emamectin Benzoate Tech (HEIBEI WEIYUAN) | 2 (as pure) | active ingredient |
| Atlox ™4913 (Croda) | 2.3 | dispersant |
| PLURONIC ®6800 (BASF) | 0.8 | dispersant |
| Propylene glycol | 4 | antifreezing agent |
| RHODOPOL ®23/W (Rhodia) | 0.15 | thickener |
| Silicon oil | 0.5 | defoamer |
| water | 65.25 | carrier |

The preparation of the suspension concentrate of Emamectin benzoate was carried out using the same general method as set out in b) of Example 2, but using the components and amounts set forth above.

c) Suspoemulsion

The suspoemulsion was prepared using the same general procedure set out in c) of Example 2, using the emulsion and suspension set forth above. The suspoemulsion was tested for elevated temperature storage stability at 54° C. for 14 days as described in more detail below.

Comparative Example E

The composition of Comparative Example E was prepared using the same procedure as was used in Example 5. The components and amounts are all same as used in Example 5 except propylene carbonate (Local) replaced SOLVESSO™ 150 in a) of Example 5.

Example 6

A suspoemulsion formulation was prepared as follows:
a) Oil in Water Emulsion Preparation of Lambda-Cyhalothrin EW Phase

| Content | Weight (g) | Remark |
|---|---|---|
| Lambda-cyhalothrin Tech | 2 (as pure) | active ingredient |
| SOLVESSO ™100 (Clariant) | 20 | solvent |
| ALKAMULS ®OR/36 | 2 | emulsifier |

The oil-in-water emulsion of lambda-cyhalothrin EW phase was prepared in the same general manner as set out in a) of Example 2, using the components and amounts set forth above.

b) Preparation of Dispersed particles of the Flufenoxuron in a continuous water phase:

| Content | Weight (g) | Remark |
|---|---|---|
| Flufenoxuron Tech (BASF) | 30 (as pure) | active ingredient |
| Atlox ™4913 (Croda) | 2.3 | dispersant |
| PLURONIC ®6800 (BASF) | 0.8 | dispersant |
| Propylene glycol | 5 | antifreezing agent |
| RHODOPOL ®23/W | 0.15 | thickener |
| Silicon oil | 0.5 | defoamer |
| water | 37.25 | carrier |

The preparation of the suspension concentrate of Flufenoxuron was carried out using the same general method as set out in b) of Example 2, but using the components and amounts set forth above.

c) Suspoemulsion

The suspoemulsion was prepared using the same general procedure set out in c) of Example 2, using the emulsion and suspension set forth above. The suspoemulsion was tested for elevated temperature storage stability 54° C. at 14 days as explained in more detail below.

Comparative Example F

The composition of Comparative Example F was prepared using the same procedure as was used in Example 6. The components and amounts are all same as used in Example 6, except that methyl oleate (Clariant) replaced SOLVESSO™ 100 in a) of Example 6.

Example 7

A suspoemulsion formulation was prepared as follows:
a) Emulsion Concentrate Preparation of Lambda-Cyhalothrin EC Phase

| Content | Weight (g) | Remark |
| --- | --- | --- |
| Lambda-cyhalothrin Tech | 1 (as pure) | active ingredient |
| SOLVESSO ™150 (Exxon) | 10 | solvent |
| ATLOX ™4912 (Croda) | 2 | emulsifier |
| TWEEN ®80 (Croda) | 0.3 | emulsifier |

The emulsion concentrate of lambda-cyhalothrin was prepared in the same general manner as set out in a) of Example 1, using the components and amounts set forth above.
b) Preparation of Dispersed Particles of Profenofos in a Continuous Water Phase:

| Content | Weight (g) | Remark |
| --- | --- | --- |
| Profenofos Tech (Syngenta) | 60 (as pure) | active ingredient |
| TERSPERSE ®2500 (Huntsman) | 0.4 | dispersant |
| PLURONIC ®6800 (BASF) | 1.2 | dispersant |
| Propylene glycol | 4 | antifreezing agent |
| RHODOPOL ®23/W (Rhodia) | 0.15 | thickener |
| Silicon oil (Degussa) | 0.5 | defoamer |
| Water | 20.45 | carrier |

The preparation of the suspension concentrate of Profenofos was carried out using the same general method as set out in b) of Example 1, using the components and amounts set forth above.
c) Suspoemulsion The suspoemulsion was prepared using the same general procedure set out in c) of Example 1, using the emulsion and suspension set forth above. The suspoemulsion was tested for elevated temperature storage stability at 54° C. for 14 days, as explained in more detail below.

Comparative Example G

The composition of Comparative Example G was prepared using the same procedure as described above for Example 7. The components and amounts are all same as used in Example 7 except methyl oleate (Clariant) replaced SOLVESSO™ 150 in a) of Example 7.

Example 8

A suspoemulsion formulation was prepared as follows:
a) Oil in Water Emulsion Preparation of Lambda-Cyhalothrin EW Phase

| Content | Weight (g) | Remark |
| --- | --- | --- |
| Lambda-cyhalothrin Tech | 20 (as pure) | active ingredient |
| SOLVESSO ™100 (Exxon) | 5 | solvent |
| ALKAMULS ®OR/36 | 3 | emulsifier |

The oil-in-water emulsion of lambda-cyhalothrin EW phase was prepared in the same general manner as set out in a) of Example 2, using the components and amounts set forth above.
b) Preparation of Dispersed Particles of Diafenthiuron in a Continuous water phase

| Content | Weight (g) | Remark |
| --- | --- | --- |
| Diafenthiuron (Shanxi Hengtian) | 10 (as pure) | active ingredient |
| SOPROPHOR ®3 D33 (Rhodia) | 2.3 | dispersant |
| PLURONIC ®10100 (BASF) | 2.3 | dispersant |
| Propylene glycol | 4 | antifreezing agent |
| RHODOPOL ®23/W | 0.15 | thickener |
| Silicon oil (Degussa) | 0.5 | defoamer |
| Water | 52.75 | carrier |

The preparation of the suspension concentrate of Diafenthiuron was carried out using the same general method as set out in b) of Example 2, using the components and amounts set forth above.
c) Suspoemulsion The suspoemulsion was prepared using the same general procedure set out in c) of Example 2, using the emulsion and suspension set forth above. The suspoemulsion was tested for elevated temperature storage stability at 54° C. for 14 days as explained in more detail below.

Comparative Example H

The composition of Comparative Example H was prepared using the same procedure as used in Example 8. The components and amounts are all same as used in Example 8, except that ISOPAR™ L (Exxon) replaced SOLVESSO™ 100 in a) of Example 8.

Example 9

A suspoemulsion formulation was prepared as follows:
a) Emulsion Concentrate Preparation of Lambda-Cyhalothrin EC Phase

| Content | Weight (g) | Remark |
| --- | --- | --- |
| Lambda-cyhalothrin Tech | 40 (as pure) | active ingredient |

-continued

| Content | Weight (g) | Remark |
|---|---|---|
| SOLVESSO ™100 (Exxon) | 40 | solvent |
| ALKAMULS ®OR/36 | 3 | emulsifier |

The emulsion concentrate of lambda-cyhalothrin was prepared in the same general manner as set out in a) of Example 1, using the components and amounts set forth above.

b) Preparation of Dispersed Particles of the Chlorfluazuron in a Continuous Water Phase:

| Content | Weight (g) | Remark |
|---|---|---|
| Chlorfluazuron Tech (Ishihara Sangyo) | 1 (as pure) | active ingredient |
| TERSPERSE ®2500 (Huntsman) | 2.5 | dispersant |
| SOPROPHOR ® FLK (Rhodia) | 1 | dispersant |
| Propylene glycol | 4 | antifreezing agent |
| RHODOPOL ®23/W | 0.15 | thickener |
| Silicon oil | 0.5 | defoamer |
| Water | 7.85 | carrier |

The preparation of the suspension concentrate of Chlorfluazuron was carried out using the same general method as set out in b) of Example 1, using the components and amounts set forth above.

c) Suspoemulsion

The suspoemulsion was prepared using the same general procedure set out in c) of Example 1, using the emulsion and suspension set forth above. The suspoemulsion was tested for low temperature storage stability (−5° C.), elevated temperature storage stability (54° C.), and the stability when diluted at 30° C., as explained in more detail below.

Comparative Example I

The composition of Comparative Example I was prepared using the same procedure as used in Example 9. The components and amounts are all same as used in Example 9, except that ISOPAR™ M (Clariant) replaced SOLVESSO™ 100 in a) of Example 9.

Example 10

A suspoemulsion formulation was prepared as follows:
a) Oil-in-Water Emulsion Preparation of Lambda-Cyhalothrin EW Phase

| Content | Weight (g) | Remark |
|---|---|---|
| Lambda-cyhalothrin Tech | 40 (as pure) | active ingredient |
| SOLVESSO ™100 (Exxon) | 20 | solvent |
| ALKAMULS ®OR/36 | 3 | emulsifier |

The oil-in-water emulsion of lambda-cyhalothrin EW phase was prepared in the same general manner as set out in a) of Example 2, using the components and amounts set forth above.

b) Preparation of Dispersed Particles of the Thifluzamide in a Continuous Water Phase:

| Content | Weight (g) | Remark |
|---|---|---|
| Thifluzamide Tech (DOW) | 4 (as pure) | active ingredient |
| Atlox ™4913 (Croda) | 2.3 | dispersant |
| PLURONIC ®6800 (BASF) | 0.8 | dispersant |
| Propylene glycol | 4 | antifreezing agent |
| RHODOPOL ®23/W | 0.15 | thickener |
| Silicon oil (Degussa) | 0.5 | defoamer |
| Water | 74.75 | carrier |

The preparation of the suspension concentrate of Thifluzamide was carried out using the same general method as set out in b) of Example 2, using the components and amounts set forth above.

c) Suspoemulsion

The suspoemulsion was prepared using the same general procedure set out in c) of Example 2 using the emulsion and suspension set forth above. The suspoemulsion was tested for elevated temperature storage stability at 54° C. for 14 days as explained in more detail below.

Comparative Example J

The composition of Comparative Example J was prepared using the same procedure as used in Example 10. The components and amounts are all same as used in Example 10 except that methyl oleate (Clariant) replaced SOLVESSO™ 100 in a) of Example 10.

Stability Test Results

The compositions of the Examples and Comparative Examples, as set forth above, were tested for heat storage stability. Heat storage stability was tested in an oven maintained at a temperature of 54° C. for 14 days. Before and after heat storage at 54° C., lambda-cyhalothrin amount was tested by High Performance Liquid Chromatography (HPLC). After heat storage, the amounts of lambda-cyhalothrin were then used to calculate a decomposition rate of lambda-cyhalothrin during heat storage at 54° C.

In addition, the characteristics of the suspoemulsion after elevated storage were observed after the exposure of the samples to the elevated temperature of 54° C. was ended and the samples were kept at ambient temperature for one to two days. In particular, the flowability of the sample and any crystal formation in the sample were noted.

The performance of the various formulations with respect to suspensibility and dispersibility were also determined before and after heat storage at 54° C. In one 250 ml cylinder with CIPAC D water, 1 g of sample was added. If the sample dropped to the bottom of the cylinder quickly (i.e., a few seconds), this was taken as an indication that the sample had poor dispersibility. If the sample dispersed in water immediately, this was taken as an indication that the sample had a good dispersibility.

The cylinder was then covered with a cap and was shaken 10 times vertically, and then allowed to stand for 1 minute. If some or all of the solids settled after 1 minute, then this was taken as an indication that the sample had a poor suspensibility. If only trace amounts of the solids settled after 1 minute, then this was taken as an indication that the sample had a good suspensibility.

The suspoemulsion formulations of the Examples and Comparative Examples set forth above had the following characteristics:

| Example | Lambda-cyhalothrin decomposition rate during storage | Heat storage stability at 54° C. for 14 days | Dispersibility and Suspensibility before and after storage |
|---|---|---|---|
| Example 1 | <3% | Good flowability, no crystal formation | good |
| Comparative Example A | 10% | Good flowability, no crystal formation | good |
| Example 2 | <3% | Good flowability, no crystal formation | good |
| Comparative Example B | 7% | Good flowability, no crystal formation | good |
| Example 3 | <3% | Good flowability, no crystal formation | good |
| Comparative Example C | 10% | Good flowability, no crystal formation | good |
| Example 4 | <3% | Good flowability, no crystal formation | good |
| Comparative Example D | 8% | Good flowability, no crystal formation | good |
| Example 5 | <3% | Good flowability, no crystal formation | good |
| Comparative Example E | 5% | Good flowability, no crystal formation | good |
| Example 6 | <3% | Good flowability, no crystal formation | good |
| Comparative Example F | 20% | Good flowability, no crystal formation | good |
| Example 7 | <3% | Good flowability, no crystal formation | good |
| Comparative Example G | 15% | Good flowability, no crystal formation | good |
| Example 8 | <3% | Good flowability, no crystal formation | good |
| Comparative Example H | 13% | Good flowability, no crystal formation | good |
| Example 9 | <3% | Good flowability, no crystal formation | good |
| Comparative Example I | 20% | Good flowability, no crystal formation | good |
| Example 10 | <3% | Good flowability, no crystal formation | good |
| Comparative Example J | 18% | Good flowability, no crystal formation | good |

From the experimental data set out above, it can be seen that the suspoemulsion formulation of lambda-cyhalothrin prepared as described herein has a decomposition rate during heat storage at 54° C. that is less than 3%, which is surprisingly much lower than the decomposition rate for Comparative Examples A-J. In addition, the suspoemulsion formulation described herein has good flowability and storage stability after heat storage at 54° C. Further, the suspoemulsion has good dispersibility and suspensibility for the sample before and after heat storage at 54° C. The significance of this result is that pesticidal compositions are often stored in agricultural facilities where high temperatures, such as those that are as high as 54° C., are unavoidable. A formulation having increased stability to such storage conditions is extremely useful to farmers and others who need to store and apply such formulations to plants, such as crops.

The invention has been described herein with reference to certain specific embodiments and examples; those of skill in the art will recognize that these specific embodiments and examples are illustrative of the invention and not limiting of the scope of the invention as set forth in the appended claims.

The invention claimed is:

1. An aqueous suspoemulsion, comprising:
   (a) a dispersed oil phase comprising:
      (i) a first active ingredient comprising lambda-cyhalothrin,
      (ii) a solvent that stabilizes said lambda-cyhalothrin consisting essentially of $C_9$ aromatic hydrocarbons, $C_{10}$ aromatic hydrocarbons, or a combination of $C_9$ aromatic hydrocarbons and $C_{10}$ aromatic hydrocarbons, and the solvent having a flash point from around 122° F. to around 151° F. and present in an amount to establish a weight ratio of lambda-cyhalothrin to solvent of from 1:10 to 10:1, wherein at least a portion of the lambda-cyhalothrin is dissolved therein;
   (b) a continuous aqueous phase comprising:
      (i) at least one second active ingredient that is insoluble or sparingly soluble in water and insoluble in the solvent, which is suspended in the continuous phase,
      (ii) a dispersing agent to disperse the water-insoluble active ingredient in the continuous phase, and
      (iii) water;
      wherein the second active ingredient is selected from the group consisting of Imidacloprid, Thiamethoxam, dinotefuran, Emamectin benzoate, Abamectin, Flufenoxuron, Lufenuron, Chlorfenapyr, Diafenthiuron, Pirimiphos-methyl, Phenthoate, Fluacrypyrim, Chlorpyrifos, Tebufenpyra, Spirodiclofen, Tolfenpyrad, Spinosad, Methoxyfenozide, Thifluzamide, Tebuconazole, Sulfoxaflor, Fipronil, Profenofos, Pymetrozine, Phoxim, Spiromesifen, Chlorfluazuron, and mixtures thereof; and wherein said lambda-cyhalothrin is stable in said solvent of the suspoemulsion to provide less than 3% degradation after storage for 14 days at 54° C.

2. The suspoemulsion as claimed in claim 1, wherein the lambda-cyhalothrin is present in an amount of from about 1 to about 40% by weight of the suspoemulsion.

3. The suspoemulsion as claimed in claim 1, wherein the solvent is present in an amount of from about 2 to about 40% by weight of the suspoemulsion.

4. The suspoemulsion as claimed in claim 1, wherein the at least second active ingredient is present in an amount of from about 1 to about 60% by weight of the suspoemulsion.

5. The suspoemulsion as claimed in claim 1, dispersing agent is present in an amount of from about 1 to about 10% by weight of the suspoemulsion.

6. The suspoemulsion as claimed in claim 1, wherein the dispersed oil phase comprises an emulsion wherein lambda-cyhalothrin is an emulsified component, and wherein the continuous aqueous phase comprises a dispersion of the second water-insoluble active ingredient as a suspended component in water.

7. The suspoemulsion as claimed in claim 1, wherein water is present in an amount of from about 5 to about 95% by weight of the suspoemulsion.

8. The suspoemulsion as claimed in claim 1, wherein the $C_9$ aromatic hydrocarbon is a light aromatic naphtha solvent having an aromatic content greater than 99 wt %.

9. The suspoemulsion as claimed in claim 1, wherein the $C_{10}$ aromatic hydrocarbon is a heavy aromatic naphtha solvent, having an aromatic content greater than 99 wt %.

10. The suspoemulsion as claimed in claim 1, wherein the second active ingredient is selected from the group consisting of Imidacloprid, Thiamethoxam, Emamectin benzoate, Abamectin, Lufenuron, Profenofos, Diafenthiuron, Thifluzamide, Chlorfluazuron, Flufenoxuron, and mixtures thereof.

11. The suspoemulsion as claimed in claim 1, further comprising one or more additional solvents, one or more emulsifiers, and one or more additives suitable for use in a pesticidal formulation.

12. A process for preparing the suspoemulsion according to claim 1, comprising:
   preparing an emulsified concentrate (EC) phase comprising lambda-cyhalothrin by mixing lambda-cyhalothrin with at least one $C_9$-$C_{10}$ aromatic hydrocarbon solvent;
   preparing a suspension concentrate (SC) phase comprising a dispersion of particles of a second active ingredient, which is insoluble or sparingly soluble in water and in the $C_9$-$C_{10}$ aromatic hydrocarbon solvent, in a continuous aqueous phase by mixing the second active ingredient, one or more dispersants and/or other additives, and a required amount of water; and
   combining the EC phase with the SC phase to produce a suspoemulsion wherein the EC phase is emulsified in the SC phase.

13. A process for preparing the suspoemulsion according to claim 1, comprising:
   preparing an emulsified concentrate (EC) phase comprising lambda-cyhalothrin by mixing lambda-cyhalothrin with at least one $C_9$-$C_{10}$ aromatic hydrocarbon solvent;
   adding the EC phase into water or an aqueous solution with high shear, and thereby obtaining a lambda-cyhalothrin EW phase
   preparing a suspension concentrate (SC) phase comprising dispersion of particles of a second active ingredient, that is insoluble or sparingly soluble in water and in the at least one $C_9$-$C_{10}$ aromatic hydrocarbon solvent, in a continuous aqueous phase by mixing the second active ingredient, one or more dispersants and/or other additives, and a required amount of water; and
   combining the EW phase with the SC phase to produce a suspoemulsion.

14. A process for preparing the suspoemulsion according to claim 1, comprising:
   preparing an emulsified concentrate (EC) phase comprising lambda-cyhalothrin by mixing lambda-cyhalothrin with at least one $C_9$-$C_{10}$ aromatic hydrocarbon solvent along with one or more suitable emulsifiers;
   preparing a suspension concentrate (SC) phase comprising a dispersion of particles of a second active ingredient, which is insoluble or sparingly soluble in water and in the at least one $C_9$-$C_{10}$ aromatic hydrocarbon solvent, in a continuous aqueous phase by mixing the second active ingredient, one or more dispersants and/or other additives, and a required amount of water;
   adding the EC phase to the SC phase under continuous agitation for optimum period of time;
   preparing one or more thickeners by hydrating them with water or other aqueous solution; and
   mixing a quantity of the thickener into the mixture of the EC phase and the SC phase under continuous agitation until the result is a homogeneous suspension.

15. A process for preparing the suspoemulsion according to claim 1, comprising:
   preparing an emulsified concentrate (EC) phase comprising lambda-cyhalothrin by mixing lambda-cyhalothrin with at least one $C_9$-$C_{10}$ aromatic hydrocarbon solvent along with one or more suitable emulsifiers;
   adding the EC phase into water or an aqueous solution with high shear, and thereby obtaining a lambda-cyhalothrin EW phase;
   preparing a suspension concentrate (SC) phase comprising a dispersion of particles of a second active ingredient, which is insoluble or sparingly soluble in water and in the at least one $C_9$-$C_{10}$ aromatic hydrocarbon solvent, in a continuous aqueous phase by mixing the second active ingredient, one or more dispersants and/or other additives, and a required amount of water;
   combining the EW phase with the SC phase under continuous agitation for a period of time;
   preparing one or more thickeners by hydrating them with water or other aqueous solution;
   mixing a quantity of the thickener into the mixture of the EW phase and the SC phase under continuous agitation until the mixture is a homogeneous suspension.

16. A method for treating pests at a locus comprising applying to the pests, the locus, or both, the suspoemulsion as claimed in claim 1.

\* \* \* \* \*